No. 851,798. PATENTED APR. 30, 1907.
N. G. CHRISTIANSEN.
MARKER FOR CORN PLANTERS.
APPLICATION FILED JUNE 5, 1906.

UNITED STATES PATENT OFFICE.

NIELS G. CHRISTIANSEN, OF RINGSTED, IOWA.

MARKER FOR CORN-PLANTERS.

No. 851,798.

Specification of Letters Patent.

Patented April 30, 1907.

Application filed June 5, 1906. Serial No. 320,315.

*To all whom it may concern:*

Be it known that I, NIELS G. CHRISTIANSEN, a citizen of the United States, residing at Ringsted, in the county of Emmet, State of Iowa, have invented certain new and useful Improvements in Markers for Corn-Planters; and I do hereby declare the following to be a full, clear, and exact description of the invention, such as will enable others skilled in the art to which it appertains to make and use the same.

This invention has relation to markers for corn planters; and it has for its object the provision of simple and efficient means for changing the marker from one side to the other of the machine when the end of a row is reached.

The invention consists in providing the vehicle with a vertically arranged bevel or miter gear arranged on the carriage directly in front of the seat, which bevel wheel engages a bevel pinion on the lower end of a shaft that is provided on its upper end with a hand wheel, by which the bevel wheel may be operated. The marker extends at a right angle from the rear of a shaft arranged longitudinally on the machine and having a miter gear on its forward end which engages the first-mentioned miter gear and is operated by the latter, as is clearly shown in the annexed drawings, forming a part of this specification.

Figure 1:
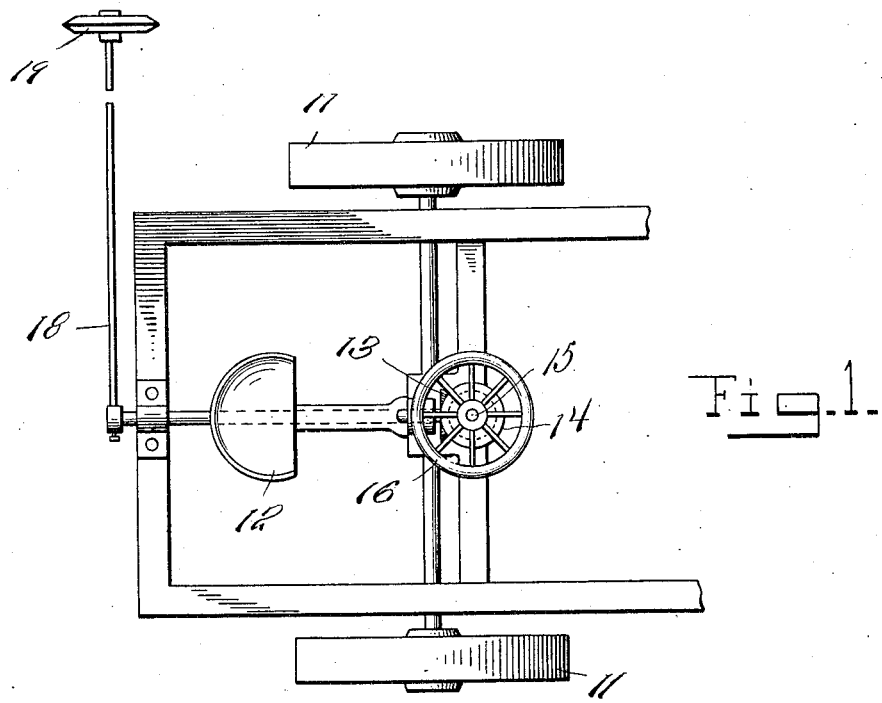
Figure 2:
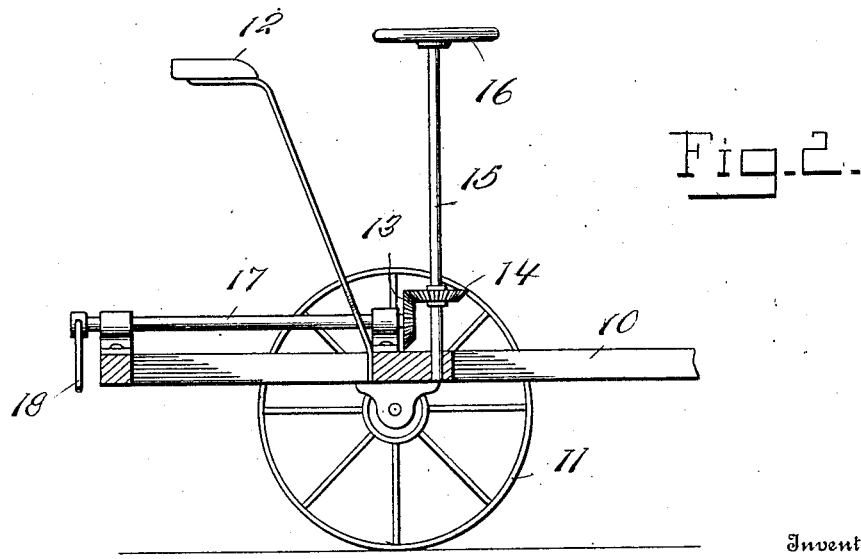

Of the said drawings, Figure 1 is a top plan view of the machine. Fig. 2 is a longitudinal section.

In the drawing, 10 designates the sulky or vehicle provided with the usual wheels 11 and seat 12. At the most convenient point in front of the seat there is arranged a bevel gear wheel 13 supported in suitable bearings, which has a bevel pinion 14 on the lower end of a shaft 15 meshing with it, so that when the bevel pinion 14 is operated the bevel wheel 13 will be moved accordingly. On the upper end of the shaft 15 is a hand-wheel 16 for operating said shaft and its bevel pinion.

17 is a shaft arranged in suitable bearings longitudinally of the machine and provided on its forward end with the bevel wheel 13 and adapted to be operated by it. At the rear end of the shaft 17 the inner end of the marker arm 18 is rigidly connected so that when a half turn is imparted to the shaft 17 the marker arm will be turned so as to extend from the opposite side of the machine to that upon which it had been operating, it being understood that the marker or drag 19 is secured to the outer end of the marker arm 18.

When the end of a row is reached the operator simply takes hold of the hand-wheel 16 and turns it to a degree sufficient to secure a change of the marker or drag from one side of the machine to the other, as described, without the need of changing the position of his body, as would be the case if he were compelled to reach out and pull a lever back or take hold of it and push it forward unlocking and locking it in its different positions.

The device as a whole is the maximum of simplicity and hence there is no liability of anything getting out of order, nor any uncertainty of its operation. Again, the parts to be operated by hand can be located at the most convenient point so that the operator need give but little time or attention to the marker-changing means and is enabled to attend to driving and turning, which is important.

What is claimed as the invention, is:—

In a marker for corn planters, the combination with a seat, of a permanently vertical shaft supported in front of the seat, in ready reach of the occupant thereon and provided on its upper end with a hand operating wheel and a bevel gear below the hand-wheel, a shaft arranged longitudinally of the implement and provided with bevel pinion meshing with the said bevel gear, and the marker-arm rigidly secured at its inner end to said shaft and provided on its outer end with a marker or drag.

In testimony whereof I affix my signature, in presence of two witnesses.

NIELS G. CHRISTIANSEN.

Witnesses:
OLE PEDERSEN,
J. S. PETERSON.